UNITED STATES PATENT OFFICE.

HERMAN OSKAR HEDSTRÖM, OF DJURSHOLM, SWEDEN.

PRODUCING COMPOUNDS OF RADIUM.

1,338,831.      Specification of Letters Patent.      Patented May 4, 1920.

No Drawing.      Application filed October 31, 1919. Serial No. 334,725.

*To all whom it may concern:*

Be it known that I, HERMAN OSKAR HEDSTRÖM, Ph. Licentiate, Government geologist, subject of the King of Sweden, residing at Djursholm, in the Kingdom of Sweden, have invented certain new and useful Improvements for Producing Compounds of Radium, of which the following is a specification.

My application for Patent, Ser. No. 305848, filed on June 21st, 1919 has for object methods for extracting or producing compounds of radium out of rocks, minerals or other materials, containing radium.

I have now found that the process will be facilitated or the extraction more complete if the liquid sulfur dioxid, used for the extraction contains sulfur trioxid, $SO_3$ (sulfuric anhydrid). For this purpose liquid sulfur dioxid may be used which on account of the manner in which it is manufactured, contains sulfur trioxid, or the sulfur trioxid may be added in suitable quantity to the liquid sulfur dioxid to be used. The quantity of sulfur trioxid may vary with regard to the properties of the material to be treated. In some cases it may be suitable to submit the liquid sulfur dioxid, containing sulfur trioxid to a drying process according to known methods. As drying agent for instance phosphorus pentoxid ($P_2O_5$) or phosphoric acid may be used.

For the rest the process may be carried out as described in my said application. Thus the extraction may be carried out at normal temperature (*i. e.* without heating) or at a raised temperature, as it in each case may be found suitable. The extraction may be carried out in a closed vessel of any construction suitable for the purpose whereby the compounds of radium are extracted from the material in question by the action of the liquid sulfur dioxid. The solution containing radium thereby obtained may be drawn off in a suitable vessel, whereafter the sulfur dioxid by evaporation is separated from the extract containing the radium compounds.

If carbonaceous raw materials are used, it may be advantageous to submit the raw material to a burning (or oxidizing) process or distilling process before it is submitted to the extraction process, whereafter the ash or the residue of the distilling process, is, in the way above stated, submitted to extraction by means of liquid sulfur dioxid.

Having thus described my invention I declare that what I claim is:

1. Method for obtaining radium compounds out of rocks, minerals or other materials, containing radium, consisting in extracting the materials by means of liquid sulfur dioxid, containing sulfur trioxid.

2. Method for obtaining radium compounds out of rocks, minerals or other materials, containing radium, consisting in extracting the materials by means of liquid sulfur dioxid, containing sulfur trioxid and treating the extract thereby obtained for obtaining radium compounds.

3. Method for obtaining radium compounds out of rocks, minerals or other materials, containing radium, consisting in extracting the materials by means of dried liquid sulfur dioxid, containing sulfur trioxid.

4. Method for producing radium compounds out of rocks, minerals or other materials, containing radium, consisting in subjecting carbonaceous materials, containing radium to a burning or distilling process extracting the ash or residue, thereby obtained by means of liquid sulfur dioxid, containing sulfur trioxid and treating the extract thereby obtained for obtaining radium compounds.

In witness whereof I have hereunto set my hand in presence of two witnesses.

HERMAN OSKAR HEDSTRÖM.

Witnesses:
AUG. HAGELIN,
ELSA JOHANSON.